United States Patent [19]

Maehara

[11] Patent Number: 4,951,771

[45] Date of Patent: Aug. 28, 1990

[54] TRACTION CONTROL SYSTEM FOR AUTOMOBILE

[75] Inventor: Toshifumi Maehara, Saitama, Japan

[73] Assignees: Akebono Brake Industry Co., Ltd.; Akebono Research and Development Centre Ltd., both of Japan

[21] Appl. No.: 370,991

[22] Filed: Jun. 26, 1989

[30] Foreign Application Priority Data

Jul. 30, 1988 [JP] Japan ................... 63-190833

[51] Int. Cl.⁵ .............................................. B60K 31/00
[52] U.S. Cl. .................................. 180/197; 123/396
[58] Field of Search ................ 180/197, 76, 175, 177; 123/396, 378

[56] References Cited

U.S. PATENT DOCUMENTS

| | | | |
|---|---|---|---|
| 4,714,864 | 12/1987 | Yogo et al. ............... | 180/197 X |
| 4,722,411 | 2/1988 | Ohashi et al. ............ | 180/197 |
| 4,750,582 | 6/1988 | Maas ....................... | 180/197 |

*Primary Examiner*—Charles A. Marmor
*Assistant Examiner*—Alan M. Kagen
*Attorney, Agent, or Firm*—Oliff & Berridge

[57] ABSTRACT

A system in which the throttle wire of an automobile engine to be operated by the accelerator pedal is arranged to as well be used for controlling a traction is disclosed.

Since the present invention is structured in such a manner that an accelerator pulley and a traction pulley are provided such that they can rotate, the accelerator pulley is arranged to be able to rotate in a first direction in which the throttle is opened by the accelerator wire connected to the accelerator pedal, while the traction pulley is arranged to be able to rotate in a second direction which is opposite to the first direction by an actuator with a traction cable, and the throttle connected to the throttle wire is returned by the rotation of the traction pulley in the second direction, the throttle can be returned to the closing direction as to reduce the engine output when detection of an acceleration slip is arisen at the start or during running of the automobile.

9 Claims, 2 Drawing Sheets

4,951,771

TRACTION CONTROL SYSTEM FOR AUTOMOBILE

BACKGROUND OF THE INVENTION

1. Field of the Invention

The present invention relates to a traction control system capable of preventing an automobile from the acceleration slip by means of controlling the engine throttle.

2. Description of the Related Art

Hitherto, there has been a traction control system for a vehicle disclosed in US 4, 722, 411 of a type arranged such that the engine throttle is controlled.

The vehicle traction control system of the type disclosed as described above is arranged in such a manner that: a main throttle valve to be operated by an accelerator pedal and a sub-throttle valve to be controlled by an electronic control circuit are connected to a suction pipe in series; the sub-throttle valve is closed in response to a signal supplied from the electronic control circuit when the driving wheel encounters an acceleration slip so that the output is lowered by restricting the amount of air intake into the engine and the driving force of the driving wheel is reduced.

However, in the above-described type traction control system for a vehicle by means of controlling the engine throttle, the size of the portion of the engine including the suction pipe becomes too large since two throttle valves, that is, the main throttle valve and the subthrottle valve, needs to be provided for the suction pipe.

SUMMARY OF THE INVENTION

To this end, an object of the present invention is to realize a system in which the throttle wire for an automobile engine to be operated by the accelerator pedal can as well be used to control the traction.

A traction control system for an automobile according to the present invention comprises:

an accelerator pulley and a traction pulley which are provided such that they can rotate, wherein the accelerator pulley is arranged to be able to rotate in a first direction in which a throttle is opened by an accelerator wire connected to an accelerator pedal, while the traction pulley is arranged to be able to rotate in a second direction which is opposite to the first direction by an actuator with a traction cable, the throttle connected to a throttle cable is returned to the closing direction by the rotation of the traction pulley in the second direction, the accelerator pulley is urged in the second direction and the traction pulley is urged in the first direction by a traction spring, a first stopper for restricting the rotation of the traction pulley in the second direction at a predetermined position is provided for the traction pulley, and a second stopper for restricting the rotation of the accelerator pulley in the second direction at a predetermined position by way of being abutted against the first stopper is provided for the accelerator pulley.

DESCRIPTION OF THE PREFERRED EMBODIMENT

Figure 1:
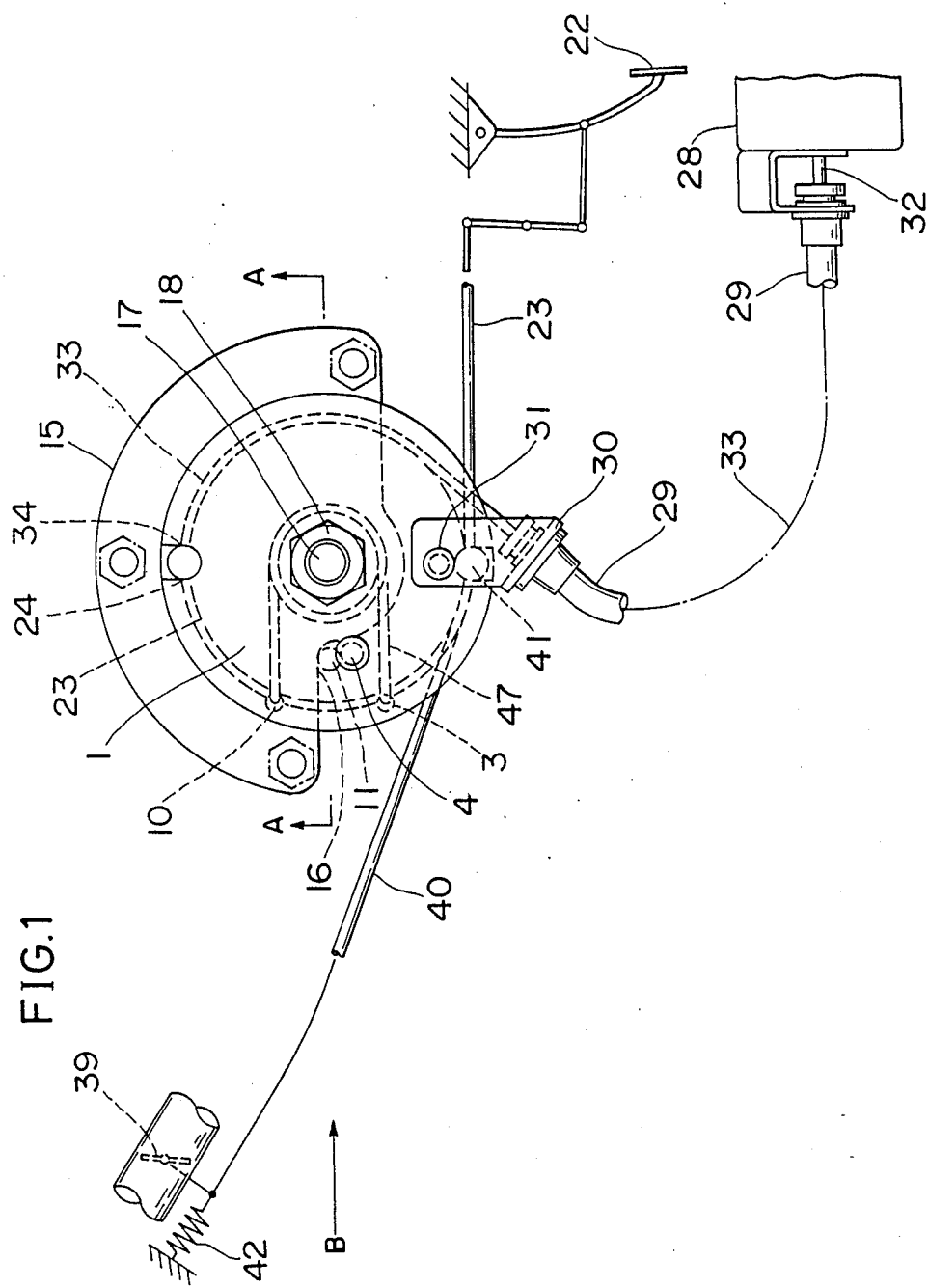
FIG. 1 is a plan view which schematically illustrates an embodiment of the present invention.
Figure 2:
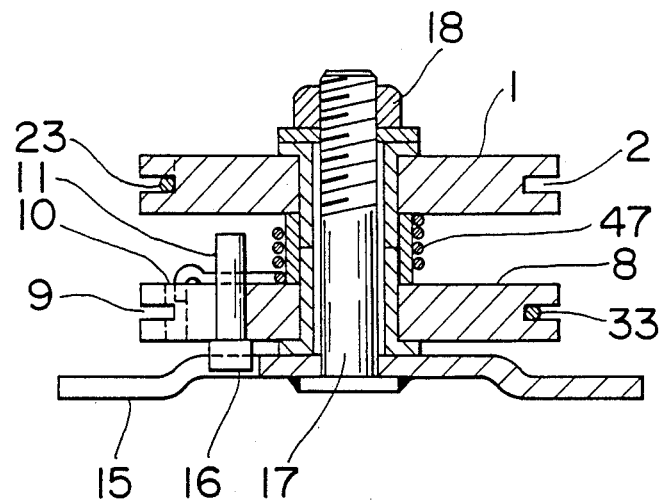
FIG. 2 is a cross-sectional view taken along line A—A of FIG. 1 and illustrating an essential portion of the present invention.
Figure 3:
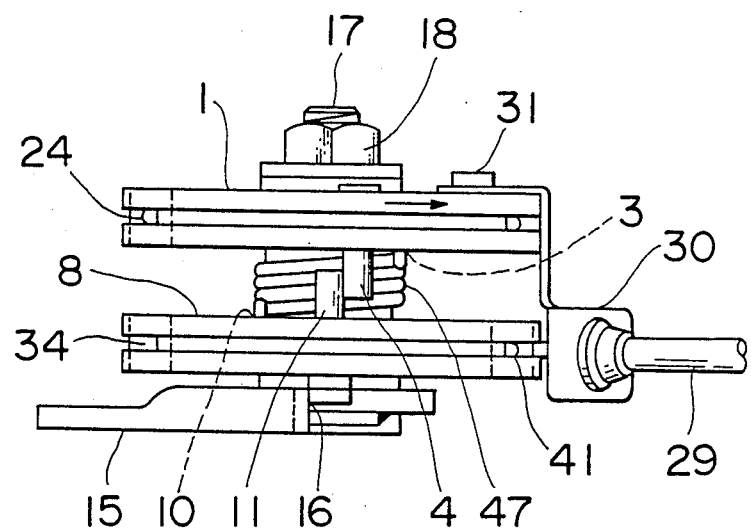
FIG. 3 is a side elevational view B of FIG. 1 and also illustrating the essential portion of the present invention.

FIGS. 1 to 3 are views which illustrate an embodiment of the present invention, wherein an accelerator pulley 1 having an outer periphery thereof provided with a guide groove 2 and a side surface thereof in which a second stopper 4 projects over this side surface and a traction pulley 8 having a side surface thereof in which a first stopper 11 projects over this side surface are fastened to a shaft 17 erected from a housing 15 such that they can rotate and are fastened by a nut 18.

A front end portion 24 of an accelerator wire 23 is connected to the outer periphery of the accelerator pulley 1, this accelerator wire 23 being allowed to project after it has surrounded the left side (FIG. 1) of the accelerator pulley 1 from the front end portion 24. The base portion of this accelerator wire 23 is connected to an accelerator pedal 22 so that the accelerator pulley 1 can be rotated in a first direction (counter-clockwise in FIG. 1) in which the throttle is opened by the accelerator wire 23 when the accelerator pedal 22 is operated.

The base portion of a bracket 30 is fastened, with a fastening bolt 31, to the outer periphery of the accelerator pulley 1, and an end portion of an outer cable 29 whose base portion is fastened to the outside portion of an actuator 28 is connected to the bracket 30.

A front end portion 34 of a traction cable 33 which has passed through the outer cable 29 is connected to the outer periphery of the traction pulley 8. This traction cable 33 surrounds the right side of the traction pulley 8 from the front end portion 34, and the base portion of the traction cable 33 is connected to a moving lever 32 of the actuator 28. The traction pulley 8 is arranged in such a manner that the same can rotate in a second direction, which is opposite direction to the above-described first direction, by means of the actuator 28 with the traction cable 33.

A front end portion 41 of a throttle wire 40 is connected to the outer periphery of the traction pulley 8, and the base portion of this throttle wire 40 is connected to a moving lever of a throttle valve 39, this throttle wire 40 being urged by a tension spring 42 in the direction in which the traction pulley 8 is rotated in the second direction. Thus, the structure is so arranged that the throttle valve 39 is opened by the throttle wire 40 which has been towed by the rotation of the traction pulley 8 in the first direction, while the throttle valve 39 connected to the throttle wire 40 is returned to the closing direction by the rotation of the traction pulley in the second direction.

A traction spring 47 is wound to a shaft 17 disposed between the accelerator pulley 1 and the traction pulley 8. An end portion of the traction spring 47 is inserted into a fitting hole 3 formed in the accelerator pulley 1 as to be fastened there, while another end portion of the same is inserted into a fitting hole 10 formed in the traction pulley 8 as to be fastened there. Thus, the accelerator pulley 1 is urged in the second direction (clockwise in FIG. 1) by this traction spring 47, while the traction pulley 8 is urged in the first direction (counterclockwise in FIG. 1).

In an non-operation mode, the first stopper 11 of the traction pulley 8 is brought to abutment against a receipt portion 16 of a housing 15 so that the traction pulley 8 is stopped and restricted at a predetermined position. In addition, the second stopper 4 of the accelerator pulley 1 is brought to abutment against this first stopper 11 of the traction pulley 8 so that the accelerator pulley 1 is prevented from being rotated in the second direction at the predetermined position.

When a force is applied to the accelerator pedal 22 and the accelerator wire 23 is thereby towed, the accelerator pulley 1 is rotated in the first direction (counterclockwise in FIG. 1). As a result, the traction pulley 8 is rotated in the first direction together with the accelerator pulley 1 with the first stopper 11 abutted against the second stopper 4 of the accelerator pulley 1 since this traction pulley 8 is pulled by the traction spring 47 urging the traction pulley 8 in the first direction in which the throttle is opened. Therefore, the throttle wire 40 is towed, causing the engine output to be enlarged.

If there were detection of an acceleration slip at the start of the automobile at the portion between the driving wheel and the road or a fear of an acceleration slip during the running of the automobile, the actuator 28 is operated in response to a signal transmitted from an electronic control unit (omitted from illustration) so that a force for towing the traction cable 33 and rotating the traction pulley 8 in the second direction acts. However, since the accelerator pulley 1 is towed in the first direction by the accelerator wire 23, the same cannot rotate in the second direction and only the traction pulley 8 rotates in the second direction against the urging force effected by the traction spring 47 by way of extending the traction spring. As a result, the throttle wire 40 is returned to the closing direction, causing the engine output to be reduced and the torque generated in the driving shaft to also be reduced.

When detection of the slip of the driving wheel is eliminated, the traction force generated by the actuator 28 is eliminated in response to a signal transmitted from the electronic control unit. As a result, the traction pulley 8 is towed by the traction spring 47 so that the same rotates in the first direction till the first stopper 11 of the traction pulley 8 is positioned to abutment against the second stopper 4 of the accelerator pulley 1. Therefore, the throttle wire is again towed to the original position and the original engine output is restored.

According to this embodiment, since the traction cable 33 is inserted into the outer cable 29, the traction cable 33 can absorb the displacement by way of being bent or forming its shape in a straight line together with the outer cable 29 even if the accelerator pulley 1 and the traction pulley 8 are rotated due to the application of a force to the accelerator pedal 22 or release of the force from it. As a result, the movement of the piston in the actuator 28 is prevented. Therefore, the force required to operate the accelerator pedal does not increase, and the durability of the piston can be improved. In this embodiment, the outer cable 29 may be omitted from the structure. In the case where the outer cable 29 is omitted from the structure, the piston in the actuator 28 is caused to be moved by the rotation of the traction pulley 8 even if the traction system were not operated.

As described above, and according to the present invention, when the accelerator pedal is applied with a force causing the accelerator pulley to be rotated by the accelerator wire and the throttle wire to be towed, the throttle wire can be operated by actuating the actuator and operating the traction cable, in which the accelerator wire is not moved. Therefore, the throttle wire can be also used to control the traction, and thereby the throttle valve can be used commonly. Consequently, the structure of the suction pipe can be simplified and the size of it can be reduced.

What is claimed is:

1. A traction control system for an automobile comprising:

an accelerator pulley and a traction pulley which are provided such that they can rotate, wherein said accelerator pulley is arranged to be able to rotate in a first direction in which a throttle is opened by an accelerator wire connector to an accelerator pedal, said accelerator wire connected by a front end portion thereof to the outer periphery of said accelerator pulley, said accelerator wire surrounds at least a part of said accelerator pulley from said front end portion and projects over said accelerator pulley, and the base portion of said accelerator wire is connected to an accelerator pedal so that said accelerator pulley rotates in said first direction in which said throttle is opened by said accelerator wire when said accelerator pedal is applied with a force;

while said traction pulley is arranged to be able to rotate in a second direction which is opposite to said first direction by an actuator with a traction cable, said throttle connected to a throttle cable is returned to the closing direction by the rotation of said traction pulley in said second direction, said accelerator pulley is urged in said second direction and said traction pulley is urged in said first direction by a traction spring;

a bracket, said bracket fastened by means of a base portion to said accelerator pulley by a fastening bolt, an end portion of an outer cable whose base portion is fastened to the outside of said actuator is fastened to said bracket, a front end portion of a traction cable passing through said outer cable is connected to the outer periphery of said traction pulley, said traction cable surrounds at least a part of said traction pulley from said front end portion and projects over said traction pulley, and the base portion of said traction cable is connected to a movable lever of said actuator so that said traction pulley can be rotated in said second direction which is opposite to said first direction by said actuator by means of said traction cable;

a first stopper for restricting the rotation of said traction pulley in said second direction at a predetermined position is provided for said traction pulley; and a second stopper for restricting the rotation of said accelerator pulley in said second direction at a predetermined position by way of being abutted against said first stopper is provided for said accelerator pulley.

2. A traction control system for an automobile according to claim 1, wherein said accelerator pulley and said traction pulley are fastened to a shaft such that they can rotate, a traction spring is wound to said shaft, an end portion of said traction spring is inserted into and fastened to a first fastening hole in said accelerator pulley, and another end is inserted into and fastened to a second fastening hole of said traction pulley so that said accelerator pulley is urged in said second direction and said traction pulley is urged in said first direction by means of said traction spring.

3. A traction control system for an automobile according to claim 1, wherein when detection of an acceleration slip arises between a driving wheel and the road at the start of the automobile or during the running of the automobile, said actuator is actuated in response to a signal supplied from an electronic control unit as to generate a force capable of towing said traction cable and to rotate said traction pulley in said second direction, said traction pulley expands said traction spring against the urging force of said traction spring as to be rotated in said second direction, and said throttle wire is returned in the closing direction so that engine output can be reduced and the torque of a driving shaft can be also reduced.

4. A traction control system for an automobile according to claim 1, wherein the front end portion of a throttle wire is connected to the outer periphery of said traction pulley, the base portion of said throttle wire is connected to a movable lever of a throttle valve, and is urged by a tensile spring so that said throttle wire is towed by the rotation of said traction pulley in said first direction as to open said throttle valve, while said throttle connected to said throttle wire is returned in the closing direction by the rotation of said traction pulley in said second direction.

5. A traction control system for an automobile comprising:
an accelerator pulley and a traction pulley which are provided such that they can rotate,
wherein said accelerator pulley is arranged to be able to rotate in a first direction in which a throttle is opened by an accelerator wire connector to an accelerator pedal,
while said traction pulley is arranged to be able to rotate in a second direction which is opposite to said first direction by an actuator with a traction cable,
said throttle connected to a throttle cable is returned to the closing direction by the rotation of said traction pulley in said second direction,
said accelerator pulley is urged in said second direction and said traction pulley is urged in said first direction by a traction spring;
a first stopper for restricting the rotation of said traction pulley in said second direction at a predetermined position is provided for said traction pulley; and
a second stopper for restricting the rotation of said accelerator pulley in said second direction at a predetermined position by way of being abutted against said first stopper is provided for said accelerator pulley, wherein said first stopper is brought to abutment against a receipt portion of a housing of said traction pulley when said actuator is not operated so that said traction pulley is stopped and restricted at a predetermined position and said second stopper of said accelerator pulley is brought to abutment against said first stopper of said traction pulley so that the rotation of said accelerator pulley in said second direction is restricted at a predetermined position.

6. A traction control system for an automobile according to claim 5, wherein the front end portion of said accelerator wire is connected to the outer periphery of said accelerator pulley, said accelerator wire surrounds at least a part of said accelerator pulley from said front end portion and projects over said accelerator pulley, and the base portion of said accelerator wire is connected to an accelerator pedal so that said accelerator pulley rotates in said first direction in which said throttle is opened by said accelerator wire when said accelerator pedal is applied, with a force.

7. A traction control system for an automobile according to claim 6, wherein the base portion of a bracket is fastened to said accelerator pulley by a fastening bolt, an end portion of an outer cable whose base portion is fastened to the outside of said actuator is fastened to said bracket, a front end portion of a traction cable passing through said outer cable is connected to the outer periphery of said traction pulley, said traction cable surrounds at least a part of said traction pulley from said front end portion and projects over said traction pulley, and the base portion of said traction cable is connected to a movable lever of said actuator so that said traction pulley can rotate in said second direction which is opposite to said first direction by said actuator with said traction cable.

8. A traction control system for an automobile according to claim 5, wherein the front end portion of a throttle wire is connected to the outer periphery of said traction pulley, the base portion of said throttle wire is connected to a movable lever of a throttle valve, and is urged by a tensile spring so that said throttle wire is towed by the rotation of said traction pulley in said first direction as to open said throttle valve, while said throttle connected to said throttle wire is returned in the closing direction by the rotation of said traction pulley in said second direction.

9. A traction control system for an automobile according to claim 5, wherein said accelerator pulley and said traction pulley are fastened to a shaft such that they can rotate, a traction spring is wound to said shaft, an end portion of said traction spring is inserted into and fastened to a first fastening hole in said accelerator pulley, and another end is inserted into and fastened to a second fastening hole of said traction pulley so that said accelerator pulley is urged in said second direction and said traction pulley is urged in said first direction by means of said traction spring.

* * * * *